US011985118B2

(12) United States Patent
Neumann

(10) Patent No.: US 11,985,118 B2
(45) Date of Patent: May 14, 2024

(54) COMPUTER-IMPLEMENTED SYSTEM AND AUTHENTICATION METHOD

(71) Applicant: ADUCID S.R.O., Brno (CZ)

(72) Inventor: Libor Neumann, Prague (CZ)

(73) Assignee: ADUCID S.R.O., Brno (CZ)

( * ) Notice: Subject to any disclaimer, the term of this patent is extended or adjusted under 35 U.S.C. 154(b) by 318 days.

(21) Appl. No.: 17/613,630

(22) PCT Filed: May 13, 2021

(86) PCT No.: PCT/CZ2021/050052
§ 371 (c)(1),
(2) Date: Nov. 23, 2021

(87) PCT Pub. No.: WO2021/228293
PCT Pub. Date: Nov. 18, 2021

(65) Prior Publication Data
US 2022/0255921 A1    Aug. 11, 2022

(30) Foreign Application Priority Data

May 14, 2020    (CZ) .................................. CZ2020-271

(51) Int. Cl.
*H04L 9/40* (2022.01)
(52) U.S. Cl.
CPC ........ *H04L 63/0823* (2013.01); *H04L 63/166* (2013.01)
(58) Field of Classification Search
CPC ... H04L 63/0823; H04L 63/166; H04L 67/02; H04L 9/3263; H04L 63/0869; G06F 21/33; H04W 12/069
See application file for complete search history.

(56) References Cited

U.S. PATENT DOCUMENTS 8,527,757 B2    9/2013    Lu et al.
8,677,466 B1 *  3/2014    Chuang ................. H04L 9/3263
                                                        726/4
(Continued)

FOREIGN PATENT DOCUMENTS

CZ    2013373 A3    12/2014
CZ    2015473 A3     2/2017
(Continued)

OTHER PUBLICATIONS

International Search Report and Written Opinion for corresponding PCT application No. PCT/CZ2021/050052, mailed Jul. 5, 2021.

*Primary Examiner* — Trong H Nguyen
(74) *Attorney, Agent, or Firm* — Notaro, Michalos & Zaccaria P.C.; John S. Economou

(57) ABSTRACT

A software system that has an embedded browser, an authenticator and a data channel module where the authenticator is adapted to authenticate a user, to authenticate a data channel and to bind the user authentication with the authenticated channel is disclosed. The authenticator is further adapted to communicate with the user via a graphical user interface of the embedded browser using graphical and control primitives of the authenticator and/or using a stand-alone graphical user interface of the authenticator, and the data channel module is adapted to communicate with service provider servers via a secure protocol, to communicate with the embedded browser and to communicate with the authenticator. A method of authentication using this system increases security and user comfort when accessing services and data requiring authentication is also disclosed.

4 Claims, 5 Drawing Sheets

(56) References Cited

U.S. PATENT DOCUMENTS

| | | | |
|---|---|---|---|
| 2012/0233702 A1* | 9/2012 | Matsuda | G06F 21/608 |
| | | | 726/26 |
| 2017/0109751 A1* | 4/2017 | Dunkelberger | G06Q 20/4014 |
| 2017/0250982 A1* | 8/2017 | Yang | H04L 67/02 |
| 2019/0052603 A1* | 2/2019 | Wu | H04L 65/1059 |
| 2019/0116494 A1* | 4/2019 | Salloum | H04L 63/0838 |

FOREIGN PATENT DOCUMENTS

| | | |
|---|---|---|
| CZ | 2019221 A3 | 6/2020 |
| EP | 3000216 A1 | 3/2016 |

\* cited by examiner

COMPUTER-IMPLEMENTED SYSTEM AND AUTHENTICATION METHOD

FIELD OF ART

The present invention relates to a computer-implemented system and a method for authenticating a user to a target application and/or a service provider using the computer-implemented system.

BACKGROUND ART

Communications provided over the Internet require user authentication in order for the user to access target services, such as prepaid services or publicly inaccessible information, or services related exclusively to that authenticated user, such as bank account management or various eGovernment portals, eHealth portals and the like.

Nowadays, two methods are commonly used for communication between a user and a service provider over the Internet. The first method involves proprietary single-purpose mobile applications programmed directly for the appropriate types of smartphone operating systems, such as Android or iOS. The second method involves a universally usable web browser based on international HTML standards, http/https.

Various authentication means having varying properties are then used to ensure the security of the communication. In the case of mobile applications, the authentication means is typically a single-purpose authentication built into the application. In the case of a web browser, authentication is usually part of individual web applications and uses web browser-independent authentication tools, such as username and password, SMS one-time passwords, smart cards, FIDO, federated electronic identities (SAML, OpenID Connect).

Single-purpose mobile application authentications provide a higher level of security than web browser-independent authentication tools. However, when users use dozens of mobile applications, the users must be able to handle dozens of different authentications, remember a large number of passwords or authentication procedures, and each user is overwhelmed by various authentication requests.

The solution based on mobile applications may not be usable in classic personal computer operating systems, so besides a mobile application, an analogous web application is often created. Developing and maintaining dedicated applications for at least two different operating systems is less efficient than developing and maintaining a single web application.

The use of a web browser is possible on all platforms of mobile and classic operating systems. Web application development is simpler and largely independent of the browser and the operating system used. However, using a web browser involves security vulnerabilities and drawbacks. Separate authentication executed on application level is a system vulnerability that enables an effective MITM attack. Relying on the user's level of knowledge and vigilance when checking the server certificate used to secure the TLS channel during https communication is not secure. The use of various authentication means by various web applications or various service providers has a similar effect of overwhelming the user with authentication requests and, as a result, leads to a further loss of security.

DISCLOSURE OF THE INVENTION

The present invention relates to a computer-implemented software system comprising an authenticator, an embedded browser and a data channel module, wherein the authenticator is adapted to authenticate a user, to authenticate the data channel and to bind the user authentication to the authenticated channel, and the authenticator is further adapted to communicate with the user via a graphical user interface (GUI) of the embedded browser using graphical and control primitives of the authenticator and/or using a stand-alone graphical user interface (GUI) of the authenticator, and wherein the data channel module is adapted to communicate with service provider servers via http/https protocol, to communicate with the embedded browser and to communicate with the authenticator.

The embedded browser is a web browser based on international HTML and http/https standards. Such browser can be implemented as part of another program on a computer or mobile device, in any common operating system.

The authenticator is a dedicated program, module, or system designed to securely verify a user identity in cyberspace. For this purpose, the authenticator uses an authentication protocol using cryptographic algorithms, cryptographic keys and/or shared secrets such as passwords, PINS, private and public keys of asymmetric cryptography, certificates, etc. The authenticator preferably authenticates users to all target systems in a uniform manner and does not burden the user with different authentication behaviours for different service providers.

The authenticator also authenticates a secure data channel between the data channel module and the target web application of a service provider (preferably a TLS channel is used) and participates in binding the user authentication to the data channel authentication. Creating the authenticated channel and binding it to the user authentication secures the communication of the embedded browser with the target application of the service provider. There is then no need to address authentication at the application level of the target web application, while the security of using the target web application is increased to a level at least comparable to the security of a single-purpose mobile application.

The terms "bind to" and "bind with" are used interchangeably throughout the disclosure.

The user preferably communicates with both the target web applications (e.g. service provider applications) and the authenticator using a standard GUI of the embedded browser (using HTML standard). The module of graphical and control primitives of the authenticator is used for communication of the user with the authenticator by means of the standard GUI of the embedded browser. This will allow a unified and repeated user authentication experience.

In this preferred embodiment, the authenticator control can be initiated, for example, by means of a dedicated graphic element (e.g. an icon) of the authenticator, and subsequently the browser activates the corresponding URL containing, for example, a URI scheme registered for the authenticator. The URL contains the appropriate parameters of the graphical and/or control components of the authenticator. The URL is sent to the local interface of the module of graphical and control primitives of the authenticator, which performs the appropriate actions and returns the necessary data to be displayed by the GUI of the embedded browser.

The graphical and control primitives of the authenticator are the basic elements forming components of the GUI, especially buttons, icons, texts, etc., which serve to control the authenticator and through which the required actions are transmitted to the authenticator.

In another embodiment, the user communicates with the target web applications (e.g. service provider applications)

via the GUI of the embedded browser. The user communicates with the authenticator via a stand-alone GUI of the authenticator, or partially via a stand-alone GUI of the authenticator and partially via the GUI of the embedded browser using the module of the graphical and control primitives of the authenticator.

The data channel module is a module designed to create a data channel between the user side and the service provider side. After the creation of the data channel, the data channel module forms the ending of this channel on the user side. The data channel module is connected (data-linked, connected so as to allow transfer of data, connected as to communicate) to the embedded browser, and is also connected to the authenticator. The data channel module is adapted for communication via http/https protocol and for using cryptographic protocols to secure network communication, such as the TLS protocol.

The service provider is a server or an application that provides services or data to be used by users, and access to that data or services requires user authentication. Individual service providers are usually independent of each other and have their own web or mobile applications. The service provider application can be a target web application that the user accesses using the computer-implemented system of the invention.

The service provider may have their own authentication server or may use an authentication server of an identity provider, for example in federated identity electronic systems. In the present invention, the authentication server of the service provider or the authentication server of the identity provider communicates with the authenticator.

The service provider may place the ending (on their side) of the data channel established between the service provider and the data channel module according to the invention, for example, directly in their web application or on a front-end server (for example on a reverse proxy server) or at another ending of the data channel with https communication.

The authentication server of the service provider can be a server owned or controlled or operated by the service provider, or a server owned or controlled or operated by a third party. For example, in federated identity electronic systems, the authentication server or the authentication service is provided by an identity provider, or through an identity agent. There may be several identity providers and/or identity agents in the system.

The invention further relates to a computer-implemented method of authenticating a user to a service provider and/or a target web application, said method using the computer-implemented system according to the invention. The method comprises the steps of:
a) receiving a user request to use a service of a service provider and/or access a service provider data and/or access a target application of a service provider, wherein the request is received via an embedded browser GUI;
b) transmitting the user request, wherein the request is unauthenticated and unencrypted, to a data channel module;
c) creating an unauthenticated data channel with http/https communication between the data channel module and the service provider, initiating authentication by the data channel module, and transmitting authentication data from the data channel module to an authenticator;
d) authenticating the data channel created in step c) and authenticating the user through the authentication communication of the authenticator with the authentication server of the service provider, wherein the data channel is bound to the user authentication;
e) transmitting the user request (preferably encrypted user request) via the data channel module and the authenticated data channel to the service provider;
f) providing the service of the service provider and/or access to the data of the service provider and/or access to the target application of the service provider to the user based on the user authentication and via the authenticated data channel created in step c) and authenticated in step d).

The term 'unauthenticated data channel' used, for example, in step c) means a data channel for which authentication is not fully completed. Thus, it includes a data channel for which authentication has not been initiated as well as a data channel for which authentication has been initiated but not yet completed; for example, authentication has been partially carried out.

Binding the data channel with the user authentication can be carried out by the authenticator and/or the authentication server of the service provider.

A preferred embodiment of binding the data channel with the user authentication is a procedure of creating the data channel and subsequent authentication, in which the certificate of the service provider or the target web application is transferred to the data channel module when creating the data channel. The method of creating the data channel guarantees (e.g. according to the TLS standard) a secure link between the certificate of the service provider or the target web application and the ending of the data channel at the service provider. The data channel module passes the certificate or information derived therefrom to the authenticator. At the same time, on the service provider side, the certificate is included in the configuration files of the authentication server. The certificate or information derived therefrom is then verified as part of the authentication communication. This, in addition to binding the data channel with the user authentication, also ensures that the authenticator automatically and always flawlessly checks the system certificate of the target web application, which the user himself had to do in prior art solutions.

Other methods of binding a data channel with the user authentication are known in the art. For example, such methods may include transmitting data identifying the data channel from the data channel module to the authenticator. This data is then transmitted or processed within the authentication.

Binding the data channel with the user authentication can be carried out, for example, preferably by assigning a unique identifier to the data channel created between the data channel module and the service provider before the authentication, and using this identifier as the transmitted data. For example, the data channel identifier may be assigned by the service provider or by the data channel module. The data channel identifier can be, for example, a data channel session identifier or an authentication identifier.

To increase security and avoid the risk of an attack on this channel, an additional unauthenticated data channel secret (or a cryptographic material derived from the data channel cryptographic material, e.g. from an unauthorized shared secret of both data channel endings, the creation of which is described, for example, in CZ PV 2013-373) can preferably be used together with the data channel identifier.

Preferably, authentication vectors described in CZ PV 2015-473 can be used for authentication communication involving binding a data channel to user authentication.

The basis of the invention is a manner of mutual cooperation of three modules, the authenticator module, the embedded browser module and the data channel module, and their inclusion into one entity.

According to the invention, authentication is activated directly from the web browser. Mutual communication between the browser and the authenticator takes place within one software system entity. This increases security and overcomes barriers to the mutual communication of programs in different operating systems. The user experience is also improved, because the user is not burdened by switching between different programs, instead, the user works and interacts only with the browser. The authenticator authenticates the user to various target systems in a uniform manner, and thus does not burden the user with different authentication behaviours for different service providers. In addition, the presence of the embedded browser in the same computer-implemented system as the authenticator enables the use of the embedded browser GUI for the communication of the authenticator with the user.

The authenticator and/or the authentication server binds the user authentication with the protected data channel to the service provider, said data channel having the data channel module as its ending. This ensures the security of communication of the embedded browser with the service provider or the target web application. The service provider can rely on the fact that the data channel is secure and that at the same time it is verified which user uses the data channel. In addition, it is certain that the user uses data communication using a browser that is on the same device and in the same computer-implemented system as the user's authenticator.

The invention uses the principle of multi-channel authentication, but without the need for any actions by the user (there is no need, for example, to copy codes from SMS or to read QR codes). The communication of the user with the target web application (typically over a TLS data channel) is thus authenticated automatically and in a very secure manner.

Such fully automatic authentication of the data channel used by the embedded browser principally eliminates all social attacks on the data channel, such as phishing. The use of two authenticated channels (data channel and authentication channel) also provides a higher security than when using authentication within the data channel, e.g. resistance to MITM.

The invention also eliminates the need for specialized applications, e.g. for mobile phones, to provide authentication, since authentication does not need to be addressed at the application level of the web application. The computer-implemented system according to the invention is able to provide a reliable and secure authentication to any target web application. The programmer does not have to implement any authentication into the application, which simplifies and reduces the cost of development. At the same time, the security of using a web application increases to a level at least comparable to the security of a single-purpose mobile application.

Because web browsers and web communication are very well standardized and very widely used, it is possible to use this very powerful and productive environment to improve the functionality of the authenticator, especially when using the advanced eID ecosystem. Therefore, additional extending functionalities supporting authentication such as identity proofing, personal data management, authentication means management, etc. can be implemented as web applications and can be provided by servers operated by respective service providers. At the same time, they can be easily integrated into the GUI of the authenticator and/or into the GUI of the embedded browser, as they do not need to be implemented locally on the technical means of the user.

Figure 1A:
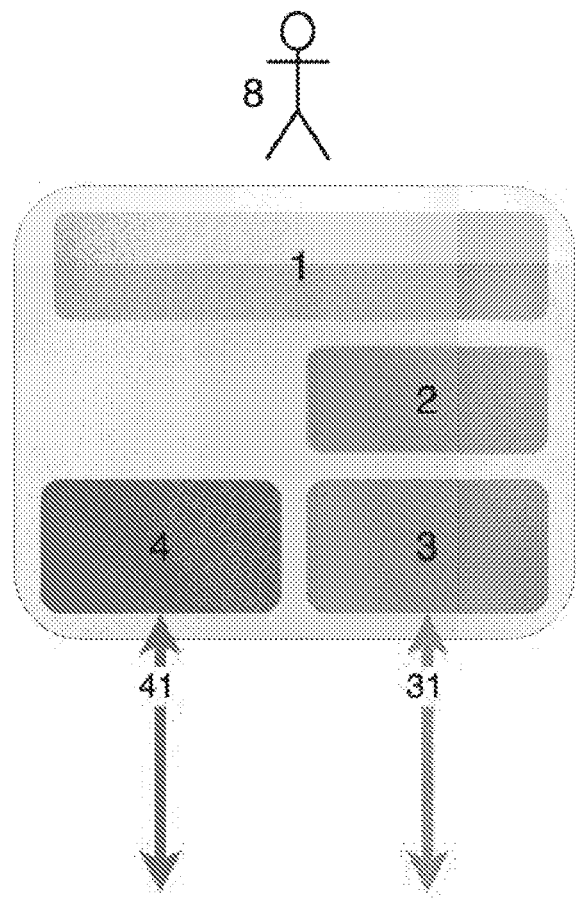
FIGS. 1A, 1B and 1C schematically illustrate embodiments of the system according to the invention.

The following reference numerals are used in the drawings:
- 1—Embedded browser
- 2—Graphical and control primitives of the authenticator
- 3—Authenticator
- 31—Authentication communication
- 4—Data channel module
- 41—Data channel with https communication
- 5—GUI of the authenticator
- 6—Service provider
- 61—Target web application of the service provider
- 62—Proxy server of the service provider
- 63—Authentication server controlled by the service provider
- 7—Identity provider
- 71—Authentication communication between the service provider and the identity provider
- 73—Authentication server controlled by the identity provider
- 8—User

EXAMPLES OF CARRYING OUT THE INVENTION

Example 1

An example of one variant of the system is schematically shown in FIG. 1A. It comprises an embedded browser 1 with an interface (GUI) for communication between a user and a target web application of a service provider (not shown) and also between the user and an authenticator 3, which is mediated by graphical and control primitives 2 of the authenticator. Furthermore, the system comprises the authenticator 3 and a data channel module 4 connected to an embedded browser 1 and the authenticator 3. When the user 8 enters a request to access the services or data of the service provider, the data channel module 4 with the server of the service provider (not shown) creates a data channel 41 with https communication secured by TLS protocol. The authenticator 3 carries out user authentication, and binds it with the data channel 41. During authentication, the authenticator 3 communicates with the authentication server of the service provider or identity provider (not shown) via an authentication communication 31.

Example 2

Figure 1B:
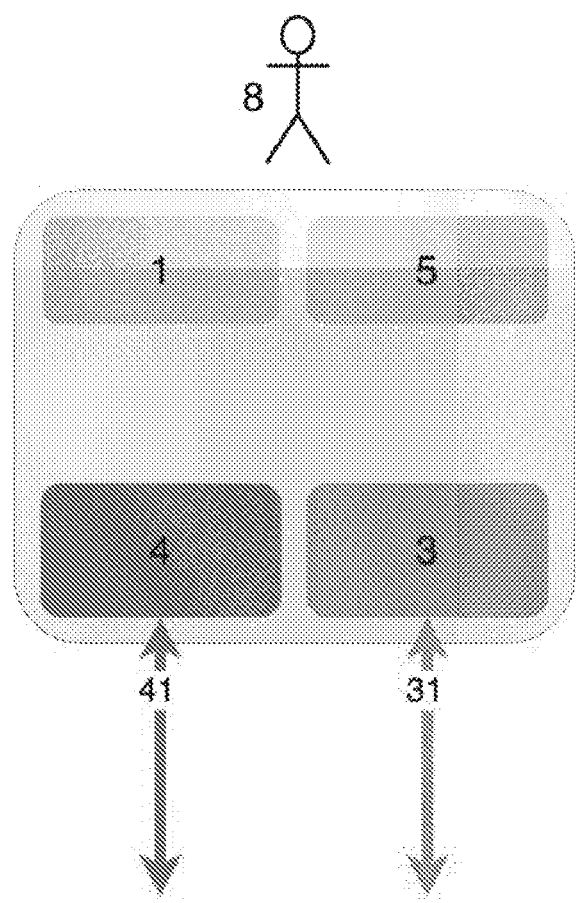

An example of another embodiment of the system is schematically shown in FIG. 1B. It comprises an embedded browser 1 and an interface 5 (GUI) of an authenticator. Communication between the user and the authenticator takes place via the GUI 5 of the authenticator. Furthermore, the system comprises the authenticator 3 and a data channel module 4 connected to a browser 1 and the authenticator 3. When the user 8 makes a request to access the services or data of the service provider, the data channel module 4 with the server of the service provider (not shown) creates a data channel 41 with https communication secured by TLS protocol. The authenticator 3 carries out user authentication, and binds it to the data channel During authentication, the authenticator 3 communicates with the authentication server of the service provider or identity provider (not shown) via an authentication communication 31.

Example 3

Figure 1C:
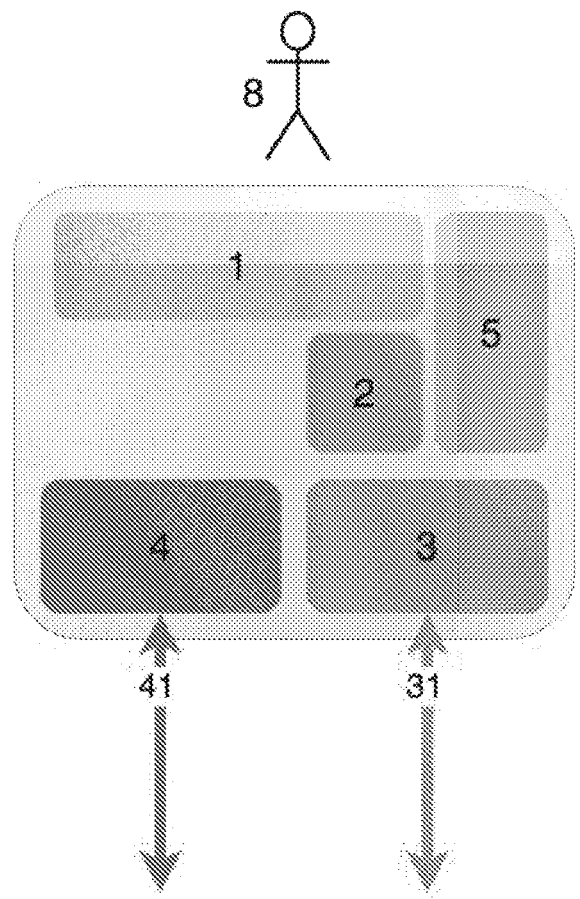

An example of yet another embodiment of the system is schematically shown in FIG. 1C. It comprises an embedded browser 1 with a GUI for communication between a user and a target web application of the service provider (not shown) and also between the user and an authenticator 3, which is mediated by graphical and control primitives 2 of the authenticator. Furthermore, the system includes a separate GUI 5 of the authenticator for communication with the user. Communication between the user and the authenticator 3 takes place partially via the GUI of the embedded browser 1 (using graphical and control primitives 2) and partially via a separate GUI 5 of the authenticator. Furthermore, the system comprises an authenticator 3 and a data channel module 4 connected to the browser 1 and the authenticator 3. When the user 8 makes a request to access the services or data of the service provider, the data channel module 4 with the server of the service provider (not shown) creates a data channel 41 with https communication secured by TLS protocol. The authenticator 3 carries out user authentication and binds it with the data channel During authentication, the authenticator 3 communicates with the authentication server of the service provider or identity provider (not shown) via an authentication communication 31.

Example 4: Authenticator Control and Management

In the embodiment according to FIG. 1A, the user wants to obtain an information from the authenticator or needs to enter an information (e.g. to obtain information about the authenticator settings and change them if necessary). The GUI of the embedded browser 1 displays a graphical element of the settings of the authenticator 3 in a standard way (HTML). After initiating (pressing) the graphical element, the embedded browser 1 activates the respective URLs containing the URI scheme registered for the authenticator 3. The URL contains the appropriate parameters of graphical and/or control component of the authenticator 3. The URL is sent to the local interface of the graphical and control primitives 2 module of the authenticator, which carries out the appropriate actions and returns the necessary data displayed by the GUI of the embedded browser 1.

Example 5: Using Remote Services

Figure 2:
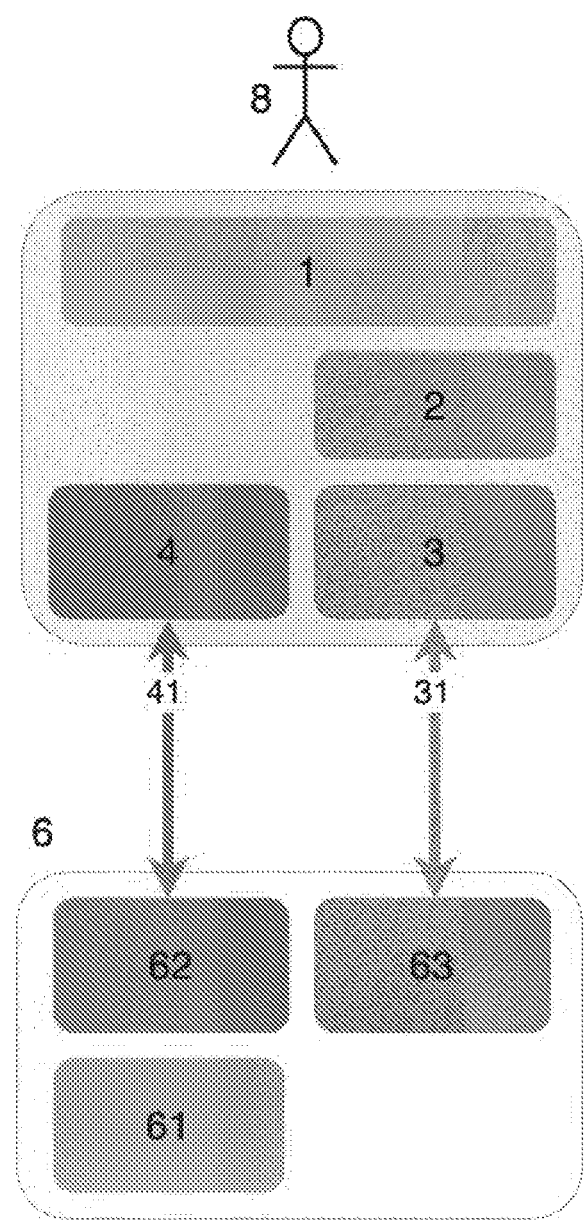
FIG. 2 schematically illustrates the use of the system according to the invention for authentication to an individual service provider.

The embodiment according to this Example is schematically shown in FIG. 2. The user wants to use a remote service of a service provider 6. In the GUI of the embedded browser 1, the user activates the request for this service with the appropriate control (e.g. by pressing a button with the graphic symbol of the service). The GUI of the embedded browser 1 creates the required request (HTML) in a standard manner to be transmitted via https to the target web application 61 of the service provider 6. The embedded browser 1 passes the (unauthenticated, unencrypted) request to the data channel module 4.

The data channel module 4, using unauthenticated https communication over a data channel 41 with a proxy server 62 of the service provider 6, activates the authentication and transmits the necessary data to the authenticator 3, including the information needed to authenticate the data channel.

The authenticator 3 initiates an authentication communication 31 with an authentication server 63 of the service provider 6. The result of the authentication is both user authentication and authentication of the data channel 41 of the target application (e.g. as described in CZ PV 2013-373, EP 3000216), and binding the user authentication with the authenticated data channel 41. The data channel 41 transmits the communication in https format secured by TLS.

The user authentication bound with the authentication of the data channel 41 can preferably be carried out as follows: the data channel module 4 passes to the authenticator 3 also the server certificate of the service provider 6 used by the data channel module 4 in creating the TLS session of the data channel 41. The authenticator 3 carries out the necessary cryptographic operations in conjunction with the use of user authentication. The result is transmitted via the authentication communication 31 to the authentication server 63. Based on the server certificate of the service provider 6, included in its configuration, the authentication server 63 verifies, using the appropriate cryptographic operations, that it is the same certificate and that it is correctly bound to the user authentication (e.g. as described in CZ PV 2015-473).

Besides, the response of the authentication server 63 to the request of the data channel module 4 transmitted through the proxy server 62 via unauthenticated https communication over the data channel 41 may preferably contain unique authentication-related information such as a unique authentication identifier and a random authentication prompt. This information is also passed by the data channel module 4 to the authenticator 3, together with the server certificate of the service provider 6. The authenticator 3 uses the user authentication with all such information received from the data channel module 4 to perform the necessary cryptographic operations and transmits the result to the authentication server 63 via the authentication communication 31. The authentication server 63 has the same information available and uses it to verify the binding of the authenticated user to the data channel 41. At the same time, the data channel 41 between the embedded browser 1 and the proxy server 62 of the service provider 6 is authenticated and it is verified that the data channel 41 is used by the authenticated user 8 (and not an attacker).

User 8 accesses the selected service using the GUI of the embedded browser 1 as usual with regular browsers.

At the same time, the data channel module 4 together with the authenticator 3 created a secure environment for the user to access the remote service using encrypted communication by means of the authenticated data channel 41 bound with the user authentication.

The data channel module 4 encrypts the user's request and transmits it via the now authenticated data channel 41 to the service provider 6. The service provider 6 has the result of the user authentication available and can assign the correct access rights to the target assets based on the authentication result. The authentication itself can take place almost invisibly for the user; the authenticator can use the features of the technical equipment of the client device of the user, e.g. the possibility of verifying biometrics using a smartphone (face, cornea, fingerprint, etc.).

Individual service providers may be independent of each other. Each of them can use a separate authentication system with its own user management, with or without authentication. There are no relationships concerning authentication or eID (electronic identity) between service providers.

The service provider 6 uses a commonly known system solution. The target web application runs on a standard web server. The encrypted TLS data channel 41 may be ended on the web server of the provider 6, for example, on the server where the target web application 61 is running, or on a front-end server 62 (e.g. on a reverse proxy server).

The authentication server 63 provides user authentication and preferably uses its authentication communication 31 to do so, and may also preferably carry out authentication of the data channel 41 and bind it to the user authentication (in cooperation with the authenticator 3). To this end, the authentication server 63 can communicate both with the ending of the data channel 41 on the proxy server 62 and with the target application 61 or the web server where the target authentication is running.

The authentication server 63 can exchange, for example, a session identifier as well as the cryptographic material needed to authenticate the data channel 41, with the ending of the data channel 41 on the proxy server 62, The authentication server 63 can exchange, for example, the parameters of the required authentication (e.g., a request to use two-factor authentication of the appropriate type) as well as authentication results (e.g., the status and identifier of the authenticated user), with the target web application 61.

Example 6: Using Services Related to the Management of Electronic Identity and Means of Electronic Identity (so-Called eID Services)

eID services are provided by an eID service provider using a standard web server on which a standard web application runs using HTML https communication with the browser.

The web application uses data stored in the secure environment of the service provider (e.g. in a database) and controls access to protected assets by enforcing access rights based on user authentication.

The authenticator provides authentication practically invisible to the user, including the authentication of the TLS data channel analogously as in the case of using remote services.

From the user's point of view, eID services are understood as an extension of authenticator services. Technologically, they are implemented analogously to standard remote services used for other purposes.

Figure 3:
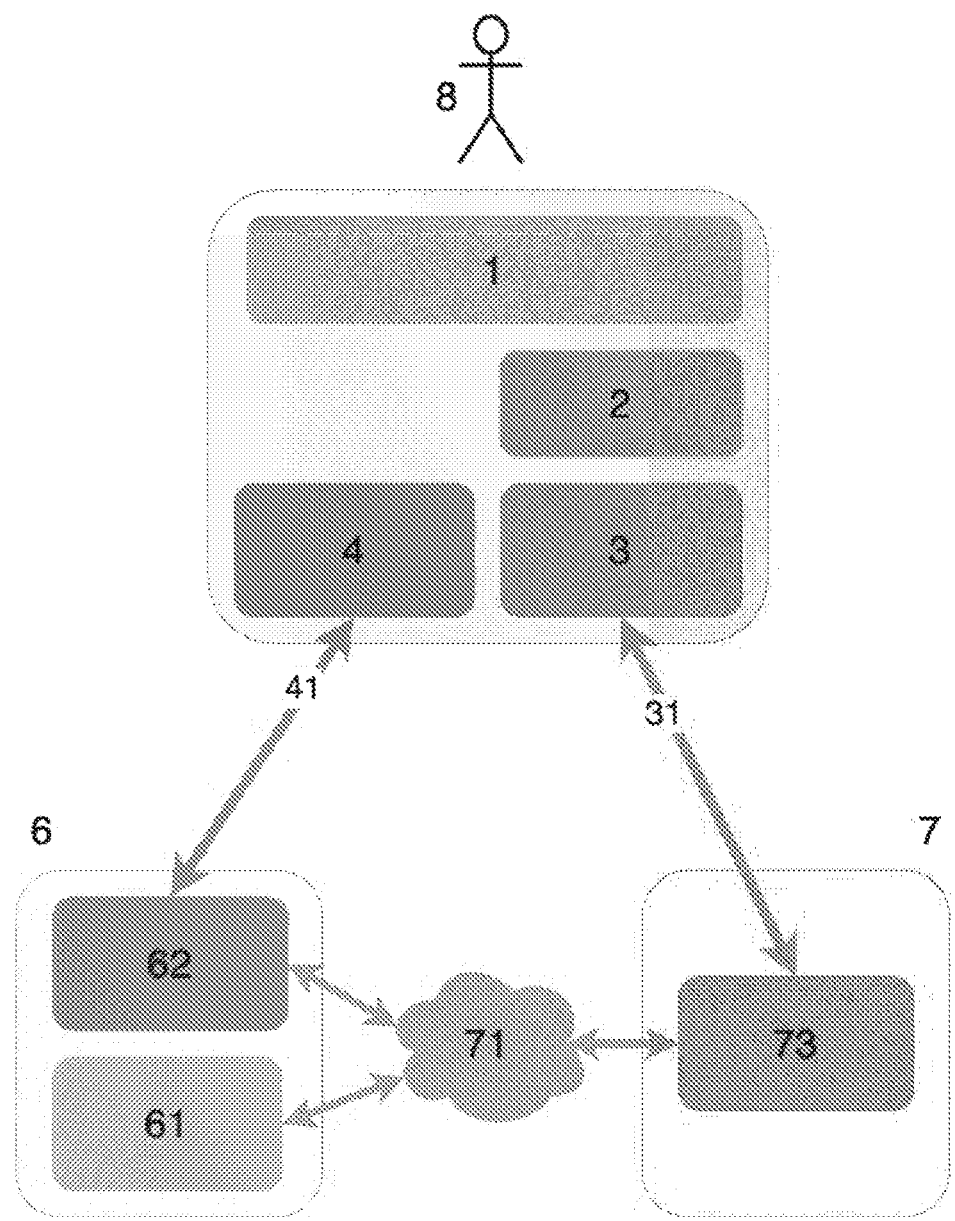
FIG. 3 schematically illustrates the use of the system according to the invention in a distributed electronic identity management environment.

Example 7: Example of Use of the Invention in a Distributed eID Management Environment An embodiment according to this Example is schematically shown in FIG. 3.

Individual service providers cooperate with each other in eID management and authentication. The ways of cooperation can vary. Examples include the analogy of electronic identity federation, where the target service provider (a relying party) relies on authentication carried out by a specialized service provider (identity provider).

A service provider 6 uses a commonly known system solution. A web application 61 is run on a standard web server.

The user wants to use a remote service of the service provider 6. In the GUI of the embedded browser 1, the user activates the request for this service with the appropriate control (e.g. by pressing a button with the graphic symbol of the service).

The GUI of the embedded browser 1 creates a required request (HTML) in a standard manner to be transmitted via https to the target web application 61 of the service provider 6.

The embedded browser 1 passes the (unauthenticated, unencrypted) request to the data channel module 4.

The data channel module 4, using the unauthenticated https communication over the data channel 41 with the proxy server 62 of the service provider 6, activates the authentication.

The service provider 6 does not use its own authentication server.

The authentication server 73 is operated by another service provider (identity provider 7). It provides user authentication and uses authentication communication 31 for this purpose. It can also preferably carry out authentication of the TLS encrypted data channel 41 between the module 4 and the remote service provider 6 and bind it with the user authentication (in cooperation with the authenticator 2).

To this end, the authentication server 73 can remotely communicate with both the data channel module 4 and the target web application 61 or proxy server 62 or the web server on which the target web application 61 is located, using various communication means to transmit authentication requests, authentication parameters and authentication results (authentication communication 71 between the service provider and the identity provider—e.g. according to the CZ PV 2019-221).

The authentication server 73 of the identity provider 7 can pass, for example, the session identifier as well as the cryptographic material needed to authenticate the data channel 41, via the authentication communication 71 between the service provider and the identity provider with, for example, the proxy server 62 of the provider 6.

The authentication server 73 can exchange, for example, the parameters of the required authentication (e.g., a request to use two-factor authentication of the appropriate type) as well as the authentication results (e.g., the status and identifier of the authenticated user) via the authentication communication 71 with the target web application 61 of the provider 6.

The invention claimed is:

1. A computer-implemented method of verifying a user to a service provider (6) and/or a target web application (61), said method using a system which comprises an embedded browser (1), an authenticator (3) and a data channel module (4), wherein the authenticator (3) is adapted to communicate with the user via a graphical user interface of the embedded browser (1), using graphical and control primitives (2) of the authenticator (3) and/or using a stand-alone graphical user interface (5) of the authenticator (3), and wherein the data channel module (4) is adapted to communicate with service provider servers via a secure protocol, to communicate with the embedded browser (1), and to communicate with the authenticator (3);

said method comprising the steps of:

a) receiving a request from the user to use a service of the service provider (6) and/or access service provider data and/or access the target web application (61) of the service provider (6), wherein the user request is received via the graphical user interface of the embedded browser (1);
b) transmitting the user request, wherein the user request is unauthenticated and unencrypted, to the data channel module (4);
c) creating an unauthenticated data channel (41) with http/https communication between the data channel module (4) and the service provider (6), initiating authentication by the data channel module (4), and transmitting authentication data from the data channel module (4) to the authenticator (3);
d) authenticating the user and authenticating the unauthenticated data channel (41) created in step c) through authentication communication (31) of the authenticator (3) with an authentication server (63) of the service provider (6) or an authentication server (73) of an identity provider (7), wherein the authenticated data channel (41) becomes bound with the user authentication;
e) transmitting the user request via the data channel module (4) and the authenticated data channel (41) to the service provider (6);
f) providing the service of the service provider (6) and/or access to the service provider data and/or access to the target web application (61) of the service provider (6) to the user based on the user authentication and via the authenticated data channel (41) created in step c) and authenticated in step d),
wherein a control of the authenticator (3) is initiated by a dedicated graphical element for the authenticator (3), and subsequently the embedded browser (1) activates a corresponding URL, wherein the corresponding URL contains corresponding parameters of a graphical and/or control competent of the authenticator (3); and the corresponding URL is sent to local interface of the graphical and control primitives (2) of the authenticator (3) which perform required actions and return corresponding data which are then displayed by the graphical user interface of the embedded browser (1).

2. The computer-implemented method according to claim 1, wherein in the system, the data channel module (4) is connected with the embedded browser (1) and is connected with the authenticator (3), and is adapted to use TLS cryptographic protocol and to communicate via http/https protocol.

3. The computer-implemented method according to claim 1, wherein the unauthenticated data channel (41) between the data channel module (4) and the service provider (6) is authenticated by means of the authenticator (3), and wherein the authenticator (3) participates in the binding of the user authentication with the authentication of the unauthenticated data channel (41).

4. The computer-implemented method according to claim 1, wherein the binding of the authenticated data channel (41) with the user authentication involves:
during creation of the unauthenticated data channel (41), a certificate of the service provider (6) or of the target web application (61) is transmitted to the data channel module (4),
wherein the certificate is included in configuration files of the authentication server (63) of the service provider (6) or the authentication server (73) of the identity provider (7);
subsequently, the data channel module (4) transmits the certificate or an information derived therefrom to the authenticator (3); and
the certificate or information derived therefrom is then verified as part of the authentication communication (31).

* * * * *